United States Patent
Schneider (10) Patent No.: US 7,035,896 B1
(45) Date of Patent: Apr. 25, 2006

(54) HOMEPAGE ACCESS METHOD, PRODUCT, AND APPARATUS

(76) Inventor: Eric Schneider, 13944 Cedar Rd., #258, University Heights, OH (US) 44118

( * ) Notice: Subject to any disclaimer, the term of this patent is extended or adjusted under 35 U.S.C. 154(b) by 749 days.

(21) Appl. No.: 09/735,114

(22) Filed: Dec. 12, 2000

Related U.S. Application Data (60) Provisional application No. 60/170,464, filed on Dec. 13, 1999.

(51) Int. Cl.
*G06F 15/16* (2006.01)

(52) U.S. Cl. .................. 709/202; 709/206; 709/203

(58) Field of Classification Search ............. 709/245, 709/226, 225, 229, 224, 202, 206, 203, 217; 455/2.01, 456.2, 186.1; 701/208
See application file for complete search history.

(56) References Cited

U.S. PATENT DOCUMENTS

| | | | | | |
|---|---|---|---|---|---|
| 5,848,396 | A | * | 12/1998 | Gerace ........................ | 705/10 |
| 5,926,116 | A | * | 7/1999 | Kitano et al. ................ | 340/988 |
| 5,949,419 | A | | 9/1999 | Domine et al. ............. | 345/744 |
| 6,003,082 | A | * | 12/1999 | Gampper et al. ............ | 709/225 |
| 6,018,619 | A | * | 1/2000 | Allard et al. ................ | 709/224 |
| 6,032,150 | A | * | 2/2000 | Nguyen ....................... | 707/102 |
| 6,057,834 | A | * | 5/2000 | Pickover ...................... | 715/846 |
| 6,091,956 | A | * | 7/2000 | Hollenberg .............. | 455/456.5 |
| 6,122,520 | A | * | 9/2000 | Want et al. ............... | 455/456.2 |
| 6,182,227 | B1 | * | 1/2001 | Blair et al. .................... | 726/5 |
| 6,219,696 | B1 | * | 4/2001 | Wynblatt et al. ........... | 709/218 |
| 6,240,360 | B1 | * | 5/2001 | Phelan ........................ | 701/208 |
| 6,256,739 | B1 | * | 7/2001 | Skopp et al. ................ | 713/201 |
| 6,606,659 | B1 | * | 8/2003 | Hegli et al. .................. | 709/225 |
| 6,636,961 | B1 | * | 10/2003 | Braun et al. .................... | 713/1 |
| 6,650,877 | B1 | * | 11/2003 | Tarbouriech et al. ..... | 455/186.1 |
| 6,671,738 | B1 | * | 12/2003 | Rajchel et al. .............. | 709/245 |
| 6,674,993 | B1 | * | 1/2004 | Tarbouriech ............... | 455/2.01 |
| 6,745,367 | B1 | * | 6/2004 | Bates et al. .................. | 715/500 |
| 6,760,770 | B1 | * | 7/2004 | Kageyama ................... | 709/229 |
| 6,799,201 | B1 | * | 9/2004 | Lee et al. ..................... | 709/217 |
| 2002/0091836 | A1 | * | 7/2002 | Moetteli ...................... | 709/227 |

FOREIGN PATENT DOCUMENTS

| | | | |
|---|---|---|---|
| JP | 11184667 A | * | 7/1999 |
| JP | 11242682 A | * | 9/1999 |
| JP | 11296428 A | * | 10/1999 |

OTHER PUBLICATIONS

Perez, Juan Carlos; Mozilla Launches Firefox 1.0, PCWORLD.com, Nov. 9, 2004 <http://www.pcworld.com/news/article/0,aid,118537,00.asp>.

* cited by examiner

*Primary Examiner*—David Wiley
*Assistant Examiner*—Michael Delgado (57) ABSTRACT

A device, network access apparatus executes any program such as a servlet, applet, script, or web browser. When a user logs in or when the user executes a program or in response to a user login, the system date/time may be determined. A URI corresponding to the system date/time may be retrieved from at least one data record of a database. The retrieved URI may then be accessed/resolved. In addition, the determination of the system date/time may be configured in response to any kind of login such as a network or web based login for the purpose of retrieving a URI as a starting page.

23 Claims, 9 Drawing Sheets

```
function OpenBrowserWindow()
{ dump("In OpenBrowserWindw()...\n");
  pref = Components.classes['component://netscape/preferences'];
        var startpage = "about:blank";
        if (pref) { pref = pref.getService();
        pref = pref.QueryInterface(Components.interfaces.nsIPref);
}
if (pref) {
  // 0 = blank
  // 1 = home (browser.startup.homepage)
  // 2 = last
        choice = 1;
      try { choice = pref.GetIntPref("browser.startup.page");
  }
    catch (ex) { dump("failed to get the browser.startup.page pref\n");
  }
  switch (choice) {
    case 0:
      startpage = "about:blank";
      break;
    case 1:
      try {startpage = pref.CopyCharPref("browser.startup.homepage");
      }
      catch (ex) {
          dump("failed to get the browser.startup.homepage pref\n");
          startpage = "about:blank";
      }
        break;
    case 2:
      try {var history = Components.classes["component://netscape/browser/global-history"].getService();
             history = history.QueryInterface(Components.interfaces.nsIGlobalHistory);
          startpage = history.GetLastPageVisted();
      }
    catch (ex) { dump(ex +"\n");
    }
       break;
    default:
      startpage = "about:blank";
  }
}
//    window.open(startpage); // This doesn't size the window properly.
  window.openDialog( "chrome://navigator/content/navigator.xul", "_blank", "chrome,all,dialog=no",
  startpage );
}
```

*Prior Art*
*Fig. 4a*

```
case 3:
    try { var calendar = Components.classes["component://calendar"].getService();
            calendar = calendar.QueryInterface(Components.interfaces.nsICalendar);
        startpage = calendar.GetURIFromCalendar();
    }
    catch (ex) {dump(ex +"\n");
    }   break;
```

ENTER URI http://homepage.com

ENTER DATE/TIME RANGE TO ACCESS URI

| Access Interval | Start Date | Start Time | End Time |
|---|---|---|---|
| Weekly ▼ | 8/31/99 | 9am | |
| Hourly / Daily / Monthly | End Date 9/1/99 | | 5pm |

( OK )  ( Cancel )

*Fig. 5c*

| URI | http://homepage.com | http://startpage.net |
|---|---|---|
| Access Interval | Weekly | Daily |
| Start Date | 8/31/99 | |
| Begin Start Time | 9am | 6pm |
| End Start Time | -- | 8pm |
| End Date | 9/1/99 | |
| Begin End Time | -- | |
| End End Time | 5pm | |

*Fig. 5d*

HOMEPAGE ACCESS METHOD, PRODUCT, AND APPARATUS

OTHER APPLICATIONS

This application claims the benefit of the following patent application, which is hereby incorporated by reference:

1. U.S. Provisional Application Ser. No. 60/170,464 filed Dec. 13, 1999, by Schneider, entitled "Method and apparatus for scheduling and accessing a starting page."

FIELD OF THE INVENTION

This invention generally relates to information access, and more specifically relates to a method, product, and apparatus for scheduling and accessing a network resource such as a starting web page.

BACKGROUND OF THE INVENTION

The Internet is a vast computer network consisting of many smaller networks that span the world. A network provides a distributed communicating system of computers that are interconnected by various electronic communication links and computer software protocols. Because of the Internet's distributed and open network architecture, it is possible to transfer data from one computer to any other computer worldwide. In 1991, the World-Wide-Web (WWW or Web) revolutionized the way information is managed and distributed.

The Web is based on the concept of hypertext and a transfer method known as Hypertext Transfer Protocol (HTTP) which is designed to run primarily over a Transmission Control Protocol/Internet Protocol (TCP/IP) connection that employs a standard Internet setup. A server computer may issue the data and a client computer displays or processes it. TCP may then convert messages into streams of packets at the source, then reassemble them back into messages at the destination. Internet Protocol (IP) handles addressing, seeing to it that packets are routed across multiple nodes and even across multiple networks with multiple standards. HTTP protocol permits client systems connected to the Internet to access independent and geographically scattered server systems also connected to the Internet.

Client side browsers, such as Netscape Navigator and/or Microsoft Internet Explorer (MSIE) provide graphical user interface (GUI) based client applications that implement the client side portion of the HTTP protocol. One format for information transfer is to create documents using Hypertext Markup Language (HTML). HTML pages are made up of standard text as well as formatting codes that indicate how the page should be displayed. The client side browser reads these codes in order to display the page. A web page may be static and requires no variables to display information or link to other predetermined web pages. A web page is dynamic when arguments are passed which are either hidden in the web page or entered from a client browser to supply the necessary inputs displayed on the web page. Common Gateway Interface (CGI) is a standard for running external programs from a web server. CGI specifies how to pass arguments to the executing program as part of the HTTP server request. Commonly, a CGI script may take the name and value arguments from an input form of a first web page which may be used as a query to access a database server and generate an HTML web page with customized data results as output that is passed back to the client browser for display.

The Web is a means of accessing information on the Internet that allows a user to "surf the web" and navigate the Internet resources intuitively, without technical knowledge. The Web dispenses with command-line utilities, which typically require a user to transmit sets of commands to communicate with an Internet server. Instead, the Web is made up of millions of interconnected web pages, or documents, which may be displayed on a computer monitor. Hosts running special servers provide the Web pages. Software that runs these Web servers is relatively simple and is available on a wide range of computer platforms including PC's.

A network resource identifier such as a Uniform Resource Identifier (URI) is a compact string of characters for identifying an abstract or physical resource. URIs are the generic set of all names and addresses that refer to objects on the Internet. URIs that refer to objects accessed with existing protocols are known as Uniform Resource Locators (URLs). A URL is the address of a file accessible on the Internet. The URL includes the name of the protocol required to access the resource, a domain name, or IP address that identifies a specific computer on the Internet, and a hierarchical description of a file location on the computer. For example the URL "http://www.example.com/index.html", where "http" is the scheme or protocol, "www.example.com" is the Fully Qualified Domain Name (FQDN), and "index.html" is the filename located on the server.

A "homepage" refers to the main web page of a web site or the starting web page that is accessed when launching a program such as a web browser. The word "home" implies that the starting web page is always accessed from the same URI. Web browsers have options, settings, or preferences for configuring what homepage is displayed. Homepage options include a user predetermined URL, a blank page, or last visited web page.

To date, there has been no demonstration of any device, method, or product that enables more options with respect to configuring a starting web page. There are no provisions for specifying or scheduling a starting page based on the current location or time of the request or for scheduling the access of multiple starting pages at the same time. For instance, there are no options for specifying between a "workpage" or "schoolpage", etc. depending on the current time instead of accessing the same "homepage". Accordingly, in light of the above, there is a strong need in the art for a system and method for accessing at least one starting web page.

SUMMARY OF THE INVENTION

The present invention enables a user to specify from a plurality of starting pages when what starting page is accessed. The invention enables a user to specify what starting page(s) may be accessed based upon location. The present invention enables a user the option to schedule on the fly any currently accessed URI from an action menu or right click menu. The invention enables a user to drag any object having a URI into a calendar object having scheduling parameters to assist with selecting a starting page that may be accessed in response to logging in and/or launching a browser program or the like.

In general, in accordance with the present invention a method for accessing a network resource includes the steps of executing a program, wherein the program can access the network resource, determining that the network resource corresponding to the program is dependent upon one of a time and location, retrieving from a data structure, a data record having the network resource, wherein the data record corresponds to one of a time and location, and accessing the network resource from the program.

The program may be one of a web browser, user login, script, servlet, and applet. The network resource may be a starting web page and accessing the network resource further includes the step of locating the network resource from an identifier, wherein the identifier may be a Uniform Resource Identifier (URI). The data structure may be retrieved from one of a list, data file, database, user modifiable configuration settings, browser preferences, starting page preferences, and configuration preferences.

The determination that the network resource corresponding to the program is dependent upon one of a time and location may further include the step of determining one of a current GPS data and current system date/time in response to executing the program wherein the step of retrieving from the data structure, the data record having the network resource may further include the step of retrieving the data record corresponding to one of a current GPS data and current system date/time. A plurality of network resources corresponding to one of a single time and a single location may be contemporaneously accessed by rendering for each accessed network resource a display window for displaying each accessed network resource.

In another aspect of the present invention a method for scheduling a network resource with a GUI interface having a GUI object and a calendar object includes the steps of dragging the GUI object into the calendar object wherein the GUI object includes the network resource as a property of the GUI object and the calendar object includes at least one scheduling parameter as a property of the calendar object, and storing the at least one scheduling parameter and the network resource in a data record of a data structure in response to dragging the GUI object into the calendar object.

The network resource may be a starting web page. The data structure may be stored in one of a list, data file, database, user modifiable configuration settings, browser preferences, starting page preferences, and configuration preferences. The input device may be one of a touch pad, touch screen, mouse, trackball, and input key. The at least one scheduling parameter may be one of a access interval, periodicity, duration, start day, end day, beginning start time, ending start time, beginning end time, and ending end time. The step of dragging the GUI object may further include the step of selecting the GUI object with an input device, wherein the input device may drag the GUI object. The GUI object may be selected from one of a bookmark, favorite URI, URI history, and location field object. Scheduling a plurality of network resources may further include the step of corresponding the plurality of network resources to one of a single time and a single location.

In another aspect of the present invention a method for scheduling a network resource with a GUI interface having a GUI object may include the steps of selecting the GUI object wherein the GUI object includes the network resource as a property of the GUI object, selecting a schedule method for the GUI object, selecting at least one scheduling parameter corresponding to the network resource in response to selecting the schedule method, and storing the network resource and the at least one scheduling parameter in a data record. The step of selecting the schedule method may further include the step of selecting the schedule method with an input device from one of a mouse click, action menu, list box, and button object.

In accordance with yet additional aspects of the present invention, a system which implements substantially the same functionality in substantially the same manner as the methods described above is provided.

In accordance with other additional aspects of the present invention, a computer-readable medium that includes computer-executable instructions may be used to perform substantially the same methods as those described above is provided.

The foregoing and other features of the invention are hereinafter fully describe and particularly pointed out in the claims. The following description and the annexed drawings set forth in detail one or more illustrative aspects of the invention, such being indicative, however, of but one or a few of the various ways in which the principles of the invention may be employed.

DETAILED DESCRIPTION OF THE INVENTION

The present invention will now be described with reference to the drawings, wherein like reference numerals are used to refer to like elements throughout.

Figure 1A:
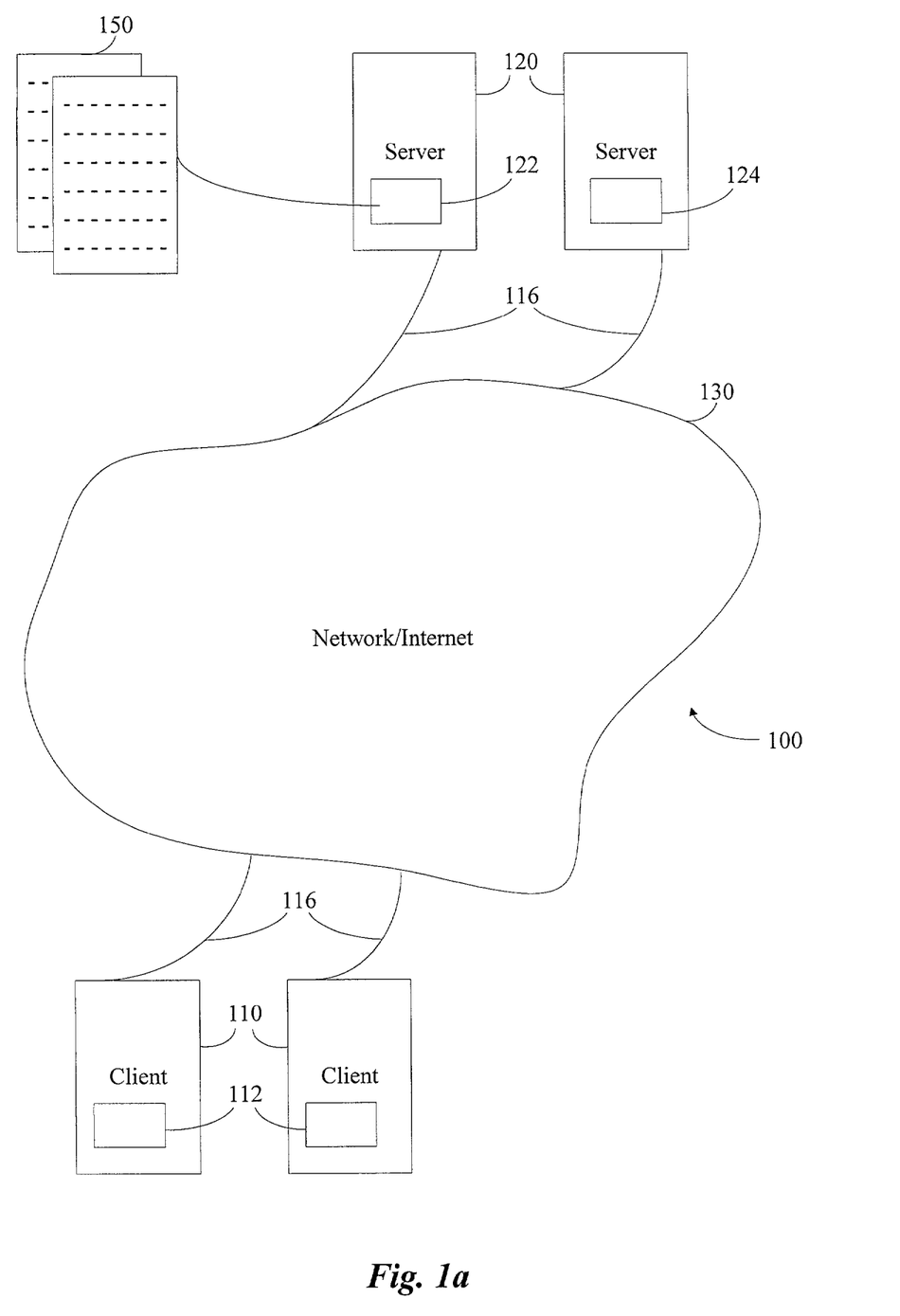
FIG. 1a is a block diagram of an exemplary distributed computer system in accordance with the present invention.

FIG. 1a illustrates an exemplary system for providing a distributed computer system 100 in accordance with one aspect of the present invention and includes client computers or any network access apparatus 110 connected to server computers 120 via a network 130. The network 130 may use Internet communications protocols (IP) to allow the clients 110 to communicate with the servers 120. The communication device of a network access apparatus 110 may include a transceiver, a modem, a network interface card, or other interface devices to communicate with the electronic network 130. The network access apparatus 110 may be operatively coupled to and/or include a Global Positioning System (GPS) via a GPS receiver (not shown). The modem may communicate with the electronic network 130 via a line 116 such as a telephone line, an ISDN line, a coaxial line, a cable television line, a fiber optic line, or a computer network line. Alternatively, the modem may wirelessly communicate with the electronic network 130. The electronic network 130 may provide an on-line service, an Internet service provider, a local area network service, a wide area network service, a cable television service, a wireless data service, an intranet, a satellite service, or the like.

The client computers 110 may be any network access apparatus including hand held devices, palmtop computers, personal digital assistants (PDAs), notebook, laptop, portable computers, desktop PCs, workstations, and/or larger/smaller computer systems. It is noted that the network access apparatus 110 may have a variety of forms, including but not limited to, a general purpose computer, a network computer, an internet television, a set top box, a web-enabled telephone, an internet appliance, a portable wireless device, a game player, a video recorder, and/or an audio component, for example.

Each client 110 typically includes one or more processors 166, memories 168, and input/output devices 170. An input device may be any suitable device for the user to give input to client computer system 110, for example: a keyboard, a 10-key pad, a telephone key pad, a light pen or any pen pointing device, a touchscreen, a button, a dial, a joystick, a steering wheel, a foot pedal, a mouse, a trackball, an optical or magnetic recognition unit such as a bar code or magnetic swipe reader, a voice or speech recognition unit, a remote control attached via cable or wireless link to a game set, television, and/or cable box. A data glove, an eye-tracking device, or any MIDI device may also be used. A display device may be any suitable output device, such as a display screen, text-to-speech converter, printer, plotter, fax, television set, or audio player. Although the input device is typically separate from the display device, they may be combined; for example: a display with an integrated touchscreen, a display with an integrated keyboard, or a speech-recognition unit combined with a text-to-speech converter.

The servers 120 may be similarly configured. However, in many instances server sites 120 include many computers, perhaps connected by a separate private network. In fact, the network 130 may include hundreds of thousands of individual networks of computers. Although client computers 110 are shown separate from the server computers 120, it is understood that a single computer might perform the client and server roles. Those skilled in the art will appreciate that the computer environment 100 shown in FIG. 1a is intended to be merely illustrative. The present invention may also be practiced in other computing environments. For example, the present invention may be practiced in multiple processor environments wherein the client computer includes multiple processors. Moreover, the client computer need not include all of the input/output devices as discussed above and may also include additional devices. Those skilled in the art will appreciate that the present invention may also be practiced via Intranets and more generally in distributed environments in which a client computer requests resources from a server computer.

During operation of the distributed system 100, users of the clients 110 may desire to access information records 122 stored by the servers 120 while utilizing, for example, the Web. Furthermore, such server systems 120 may also include one or more search engines having one or more databases 124. The records of information 122 may be in the form of Web pages 150. The pages 150 may be data records including as content plain textual information, or more complex digitally encoded multimedia content, such as software programs, graphics, audio signals, videos, and so forth. It should be understood that although this description focuses on locating information on the World-Wide-Web, the system may also be used for locating information via other wide or local area networks (WANs and LANs), or information stored in a single computer using other communications protocols.

The clients 110 may execute Web browser programs 112, such as Netscape Navigator or MSIE to locate the pages or records 150. The browser programs 112 enable users to enter addresses of specific Web pages 150 to be retrieved. Typically, the address of a Web page is specified as a URI or more specifically as a URL. In addition, when a page has been retrieved, the browser programs 112 may provide access to other pages or records by "clicking" on hyperlinks (or links) to previously retrieved Web pages. Such links may provide an automated way to enter the URL of another page, and to retrieve that page.

Figure 1B:
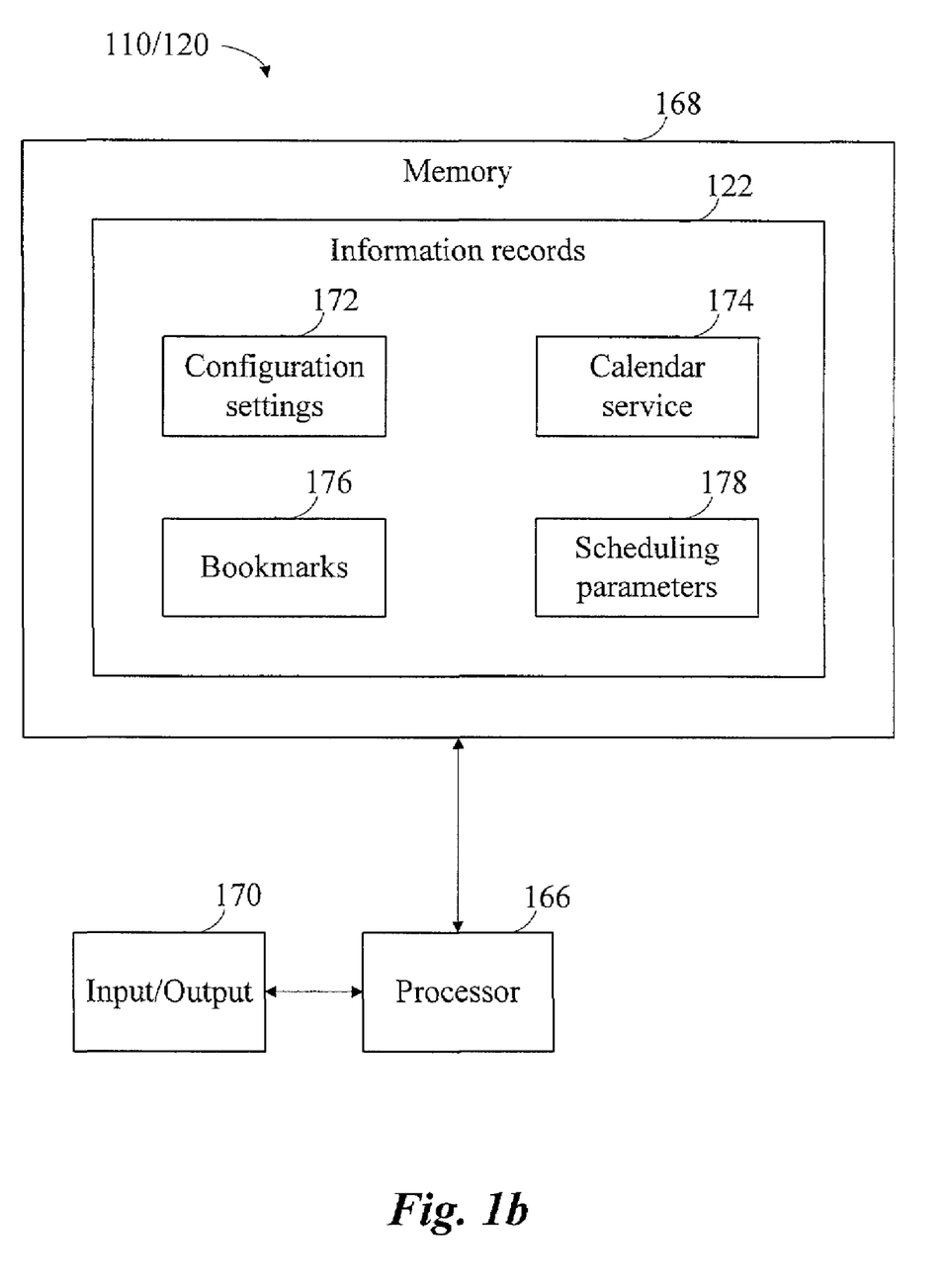
FIG. 1b is a block diagram illustrating exemplary information records stored in memory in accordance with the present invention.

FIG. 1b illustrates a block diagram of a storage device such as memory 168 in operative association with a processor 166. The processor 166 is operatively coupled to input/output devices 170 in a client 110 and/or server 120 computing system. Stored in memory 168 may be information records 122 having any combination of exemplary content such as lists, files, and databases. Such records may include for example: user modifiable configuration settings 172, calendar service 174, bookmarks 176, and scheduling parameters 178. These information records may be further introduced and discussed in more detail throughout the disclosure of this invention.

Figure 2A:
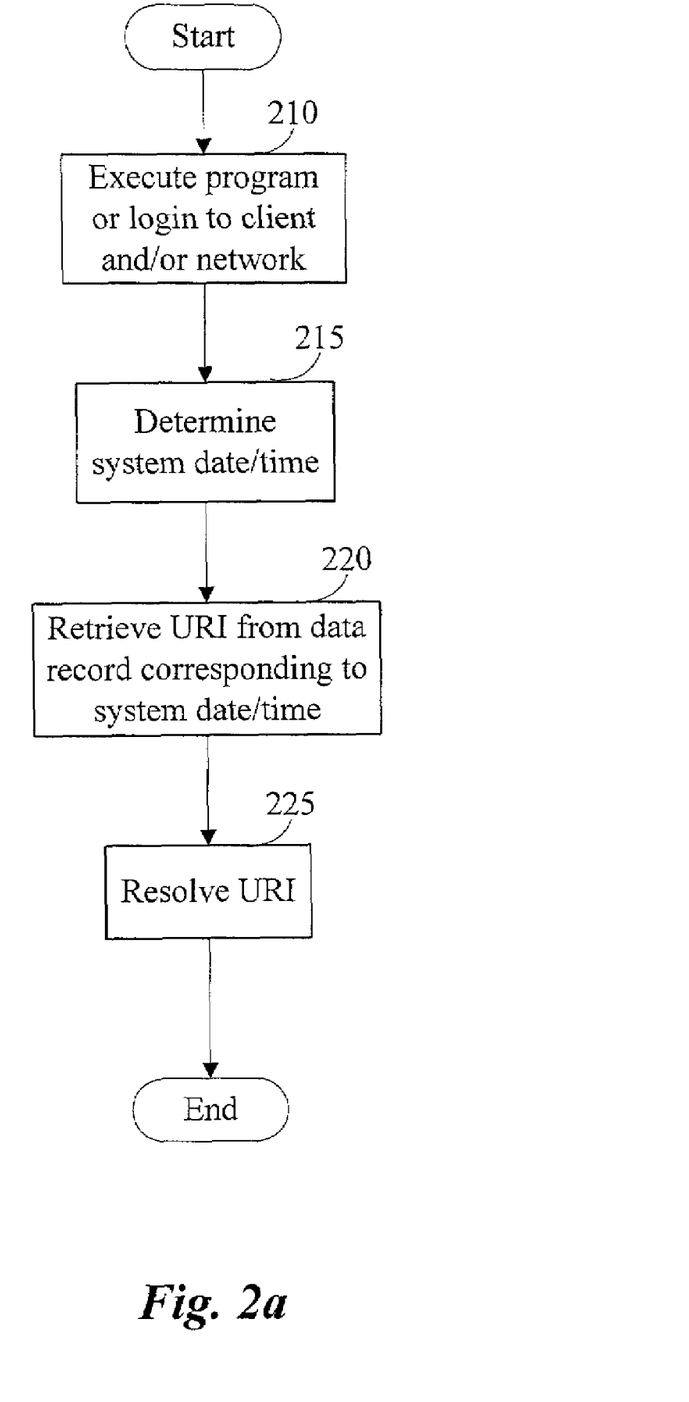
FIG. 2a is a flowchart illustrating the steps performed for selecting and resolving a URI/network resource with respect to the current system date/time in accordance with the present invention.

Referring now to FIG. 2a, when a user logs-in to a client and/or network 100 or when a program such as a servlet, applet, script, or web browser 112 is executed in step 210, the system date/time may be determined in step 215. At least one network resource or URI corresponding to the system date/time may be retrieved in step 220 from at least one data record of a database. The retrieved URI (starting web page) may then be resolved/accessed in step 225. In addition, a plurality of URIs may be configured for retrieval and be contemporaneously accessed to render or display multiple starting pages from a single action such as that of executing a program or logging in to a system. Each starting page may be further configured by user modifiable configuration settings 172 to be displayed in a separate browser window for each starting page, for example. Configuration settings 172 may further include preferences such as browser preferences, starting page preferences, and/or configuration preferences.

Figure 2B:
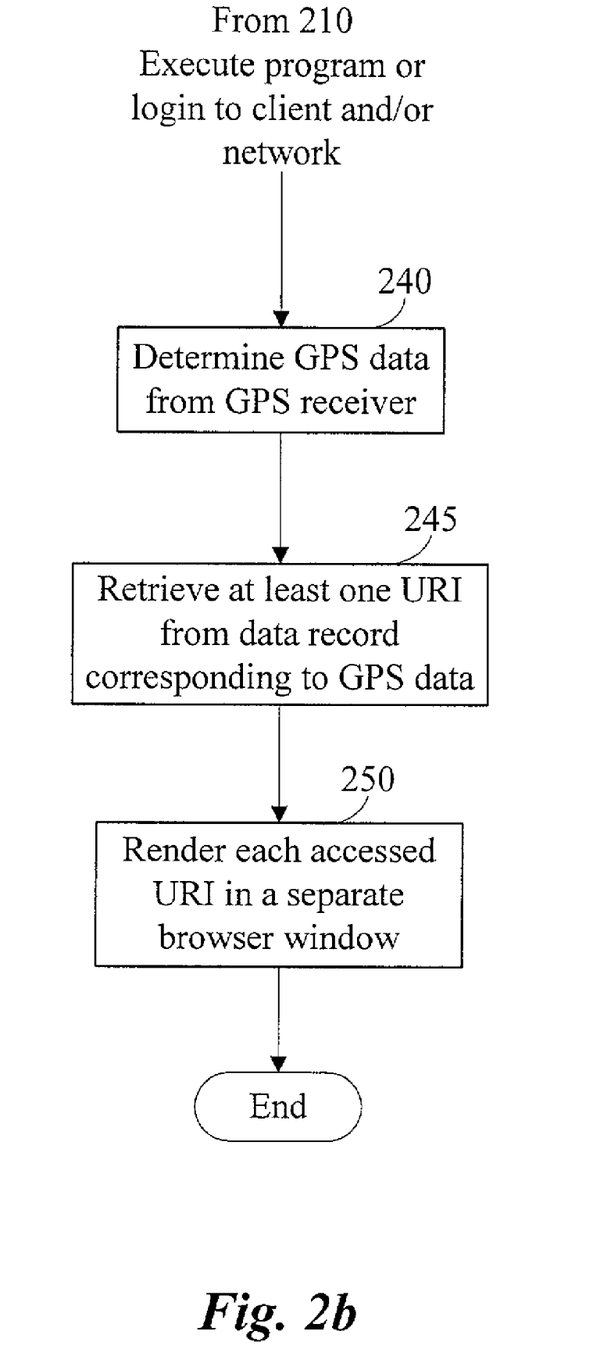
FIG. 2b is a flowchart illustrating the steps performed for selecting and accessing at least one URI with respect to the current received GPS data in accordance with the present invention.

Though it is shown above how a starting web page/network resource/URI may be dependent upon time when launching a program or logging into a system/network, a starting web page/URI may also be dependent upon location. FIG. 2b illustrates how GPS data may be used to access a starting page. When a user logs-in to a client and/or network or when a program such as a servlet, applet, script, or web browser 112 is executed in step 210, GPS data may determined in step 240 by receiving such data from a GPS receiver (not shown) coupled to the client 110, server 120, and/or network 100. At least one URI corresponding to the GPS data may be retrieved in step 245 from at least one data record of a database. The retrieved URIs (starting web pages) may then be resolved/accessed by rendering in step 250 each accessed URI in a separate browser window.

Figure 3:
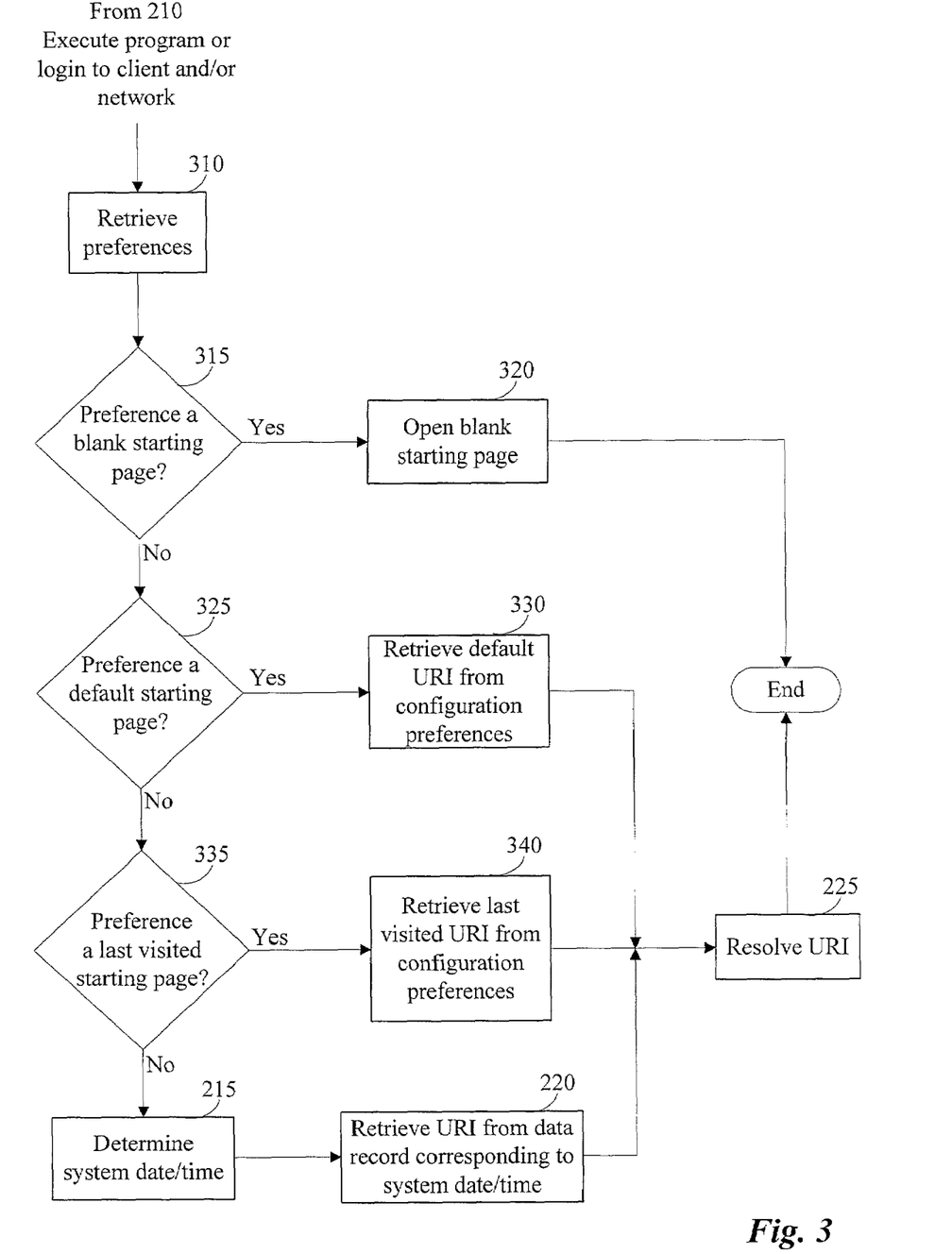
FIG. 3 is a flowchart illustrating the steps performed for retrieving preferences to determine what starting web page is accessed and displayed in accordance with the present invention.

Turning now to FIG. 3, when a user logs in or when a program is executed (step 210), browser preferences may be retrieved in step 310 to determine what starting web page 150 or homepage may be accessed and/or displayed. If it is determined in step 315 that the starting page preferences (step 310) are for a blank page, then a blank page may be opened in step 320. However, when it is determined in step 325 that the starting page preferences are for a default page, then the default URI may be retrieved in step 330 from configuration preferences and the URI is resolved 225. If this is not the case, and it is determined in step 335 that the starting page preferences are for the last visited web page, then the URI of the last visited web page may be retrieved in step 340 from configuration preferences and the URI may then be resolved (step 225). When none of these cases apply, the system date/time (step 215) may then be determined. A URI corresponding to the system date/time may then be retrieved (step 220) from at least one data record of a database. The retrieved URI may then be resolved (step 225).

The following discussion introduces certain concepts for understanding the object oriented developer environment and the object oriented programming environment employed to construct the preferred embodiment and carry out the methods of the present invention. It is assumed here that the reader is familiar with the notion that an "object", for purposes of computer modeling, comprises a plurality of data items or properties, has a behavior, responds to messages from other objects, and issues messages to other objects. It will be understood that the invention could be made and used with any object-oriented development environment, such as C++, Java, or other object-oriented programming environment.

Various terms have emerged in the art to capture various aspects of "object-oriented" approaches. These terms include the words encapsulation, classes, inheritance, message-passing, and polymorphism. The term "classes" relates to objects of similar types. Objects of the same class are grouped together and have certain properties, attributes, or behaviors in common. Classes may be organized into hierarchies of subclasses in which the procedures and attributes of the class are inherited by its subclasses. Thus, a "subclass" is a group of objects that have some properties, attributes, behaviors, or procedures with other groups of objects, but could have other properties, attributes, behaviors, or procedures that are different. The term "attribute" or "property" relates to data items or information or behavior that relates to a particular object. The term "inheritance" means the sharing of properties, and in some cases, attributes and behaviors, that characterizes a subclass by its parent class. The notion of inheritance purportedly allows for easier maintenance and extension of computer programs since creation of subclasses purportedly allows the program code used to created the parent class to be readily modified and reused for subclasses. An object's "procedures" or "methods" are operations upon data items, attributes, and/or properties so as to cause a computing result and provide a response. Certain aspects of object-oriented programming techniques are utilized in the present invention so as to provide extended functionality to the user interface as applied to network systems.

Figure 4A:
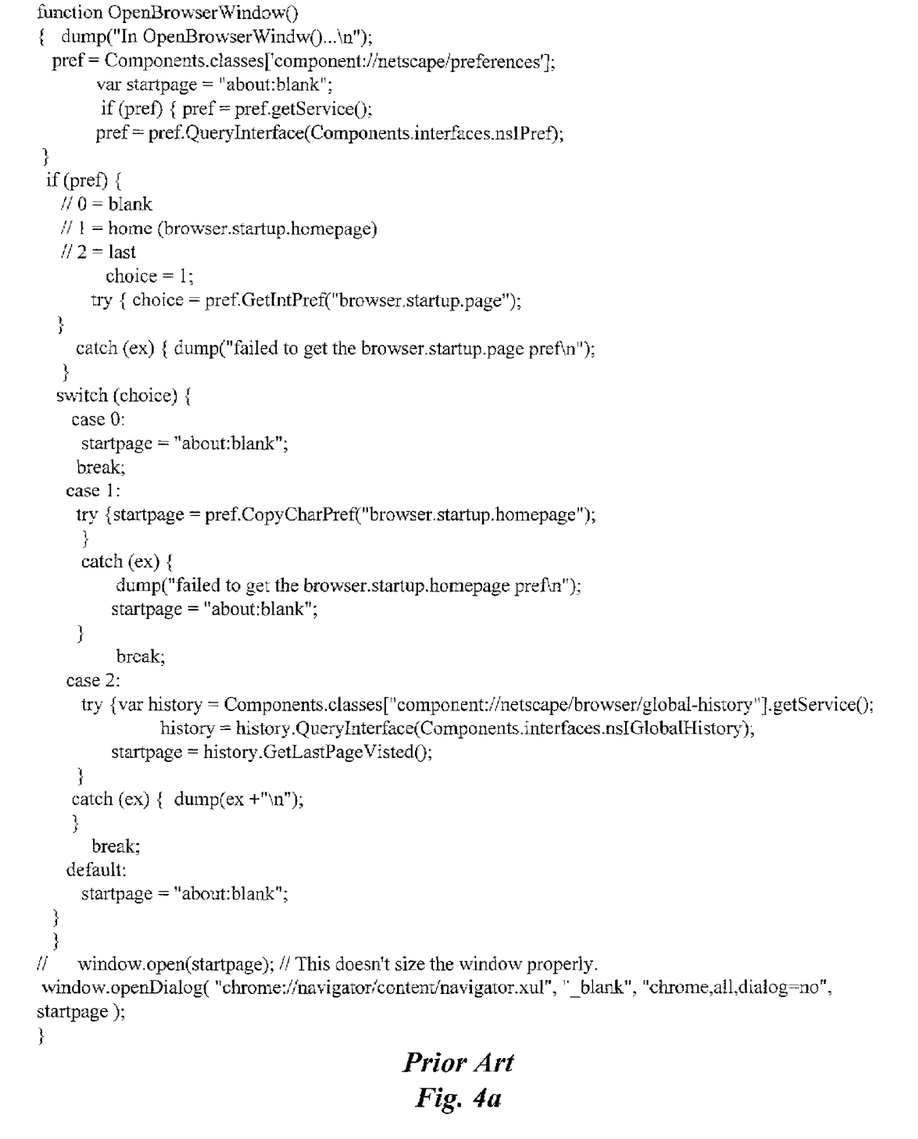
FIG. 4a is a prior art illustration depicting the source code of a function that opens a new browser window.

FIG. 4a illustrates prior art source code of a function that opens a new browser window in a Netscape browser program. The source code is part of an open source code project from Netscape called Mozilla and can be accessed from "http://www.mozilla.org". Included in the function are cases 0, 1, 2 for determining whether a blank page, predetermined page, or last visited page is respectively accessed as a starting web page. Particularly in case 2, an interface call may be made to a component class for accessing Global History data. Interface interrogation is a simple, uniform mechanism for determining which interfaces an object supports, and for hiding the mechanics of how the object was implemented. Interface interrogation is performed using the QueryInterface( ) method. The caller passes in an ID and a pointer to an address to place the resulting interface. If the query is successful, QueryInterface( ) will return NS_OK. If the object does not support the given interface, it will return NS_NOINTERFACE.

There are two methods (calendaring and scheduling) for modifying the source code of FIG. 4a to enable the accessing of URI data based upon the current system date/time. The following terminology is defined in the working draft dated Oct. 4, 1999, entitled, "Implementers' Guide to Internet Calendaring" at "http://www.ietf.org/internet-drafts/draft-ietf-calsch-imp-guide-OO.txt" from the Internet Engineering Task Force (IETF) Calendaring and Scheduling Working Group, which is herein incorporated by reference.

Calendar

A collection of events, todos, journal entries, etc. A calendar could be the content of a person's or a resource's agenda; it could also be a collection of data serving a more specialized need. Calendars are the basic storage containers for calendaring information.

Calendar Service

A running server application which provides access to a collection of calendars.

Calendar Store

A data store of a calendar service. A calendar service may have several calendar stores, and each store may contain several calendars, as well as properties and components outside of the calendars.

Calendar User Agent (CUA)

Software used by the calendar user, which communicates with calendar services to provide the user access to calendar information.

Component

A piece of calendar data such as an event, a todo or an alarm. Information about components is stored as properties of those components.

Property

A property of a component, such as a description or a start time.

Figure 4B:
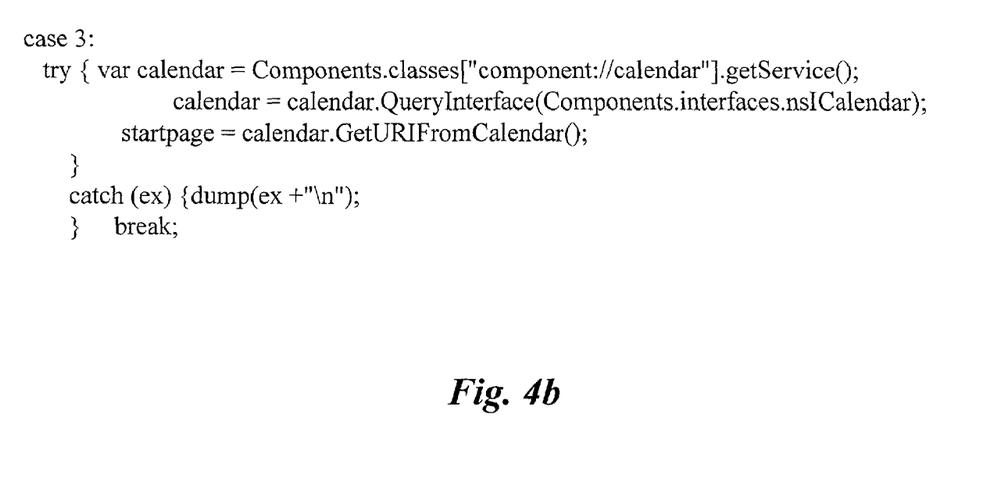
FIG. 4b is an illustration depicting source code of an extra function that may be included to the source code as illustrated in FIG. 4a in accordance with the present invention.

FIG. 4b illustrates modifications that may be made to the source code illustrated in FIG. 4a by adding another case, called case 3. The NSCalendar class is used to contain a user's calendaring data. Typically, a NSCalendar may contain several Calendar components (events, todos, journals, timezone, and free-busy). The Calendar Component classes represent iCalendar components. Components include events, todos, journals, timezones, free-busy info, and alarms. Components contain calendar properties. Events and Todos may also contain Alarm Components. Modifications are made to the NSCalendar class to allow Calendar Components to store and process URIs as events and properties, in addition to conventional data types such as date, character, numeric, and Boolean. Particularly in case 3, an interface call may be made to a component class for accessing Calendar data from a calendar service 174. A new function may be created called GetURIFromCalendar( ) which access URIs based upon the current system date/time and/or GPS data from the properties of calendar component data such as todo, alarm, or event data.

Creating a new component class allows for the flexibility of scheduling URIs from any executable program. Sharing scheduling data across different applications or even platforms becomes important for enabling an open architecture to be applied to URI calendar data scheduling. Though it is discussed above how to integrate the scheduling of URI calendar data from any application. More specific methods may be utilized with regard to URI scheduling of starting pages. A dedicated scheduler for the entry of time based URI data may be integrated into the browser program itself or part of a suite of network or login access related executable programs.

Figure 5A:
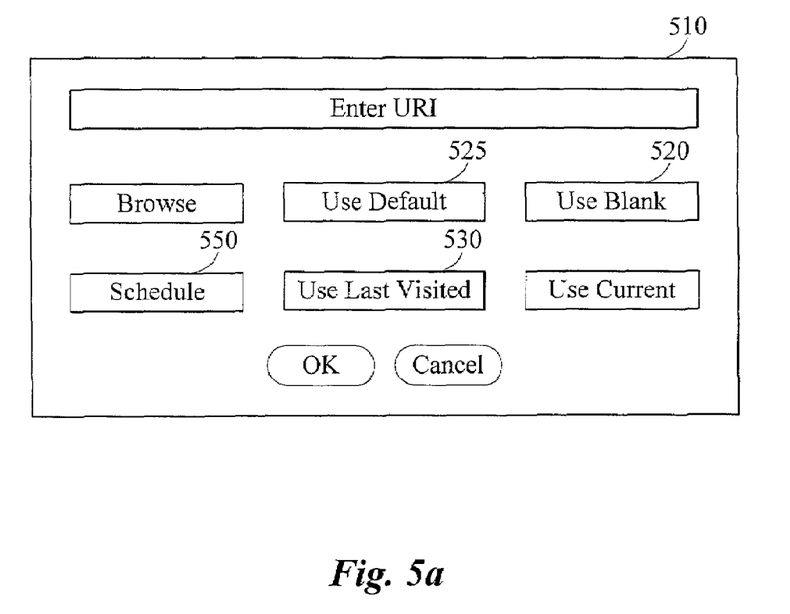
FIG. 5a is an illustration of a Graphical User Interface (GUI) for selecting a starting page in accordance with the present invention.

FIG. 5a illustrates an example of a Graphical User Interface (GUI) 510 for selecting a starting page. Included in the GUI 510 are known text box and button objects from existing browser programs such as Netscape or MS Internet Explorer. There is a text box object for entering a URI, and button objects that correspond to the cases (0, 1, 2, 3) in the source code as discussed in FIGS. 4a and 4b. The "Use Blank" button object 520 may be used to assign a value of "0" in browser preferences so that Case 0 will be implemented in the open browser function as discussed above. The "Use Default" button object 525 may be used to assign a value of "1" in browser preferences so that Case 1 will be implemented in the open browser function. The "Use Last Visited" button object 530 may be used to assign a value of "2" in browser preferences so that Case 2 will be implemented in the open browser function. The "Schedule" button object 550 may be used to invoke a schedule method and assign a value of "3" in browser preferences (user modifiable configuration settings 172) so that Case 3 will be implemented in the open browser function as specified in the modified source code of FIG. 4b.

Figure 5B:
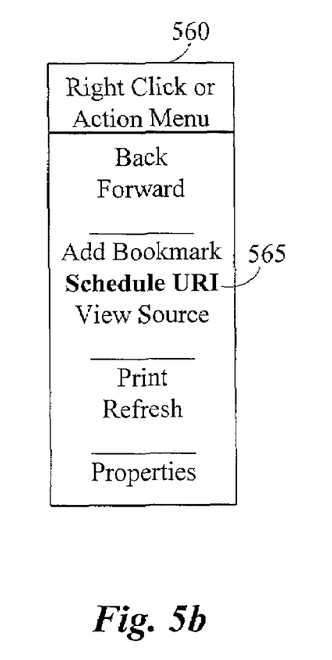
FIG. 5b is an illustration of an example of a schedule method such as a right-click menu or an action menu in accordance with the present invention.

When the "Schedule" button is activated, a GUI (not shown) of a calendar in conjunction with time intervals for a given day may be displayed for the user to select the day/date/time. The URI object may also be dragged into the GUI calendar object as a means for scheduling a starting web page. In addition, as illustrated in FIG. 5b, by using any menu such as a right-click menu 560 or an action menu, an extra option may be listed 565 to schedule URI information based upon the URI properties of the selected object. For instance, right clicking on a URI from bookmarks 176 (including favorites folder), URL history, or the location field may correspond such a selected URI with a calendar function or scheduling program. In addition, the schedule method may be selected with an input device from one of a mouse click, action menu, list box, and button object.

Figure 5C:
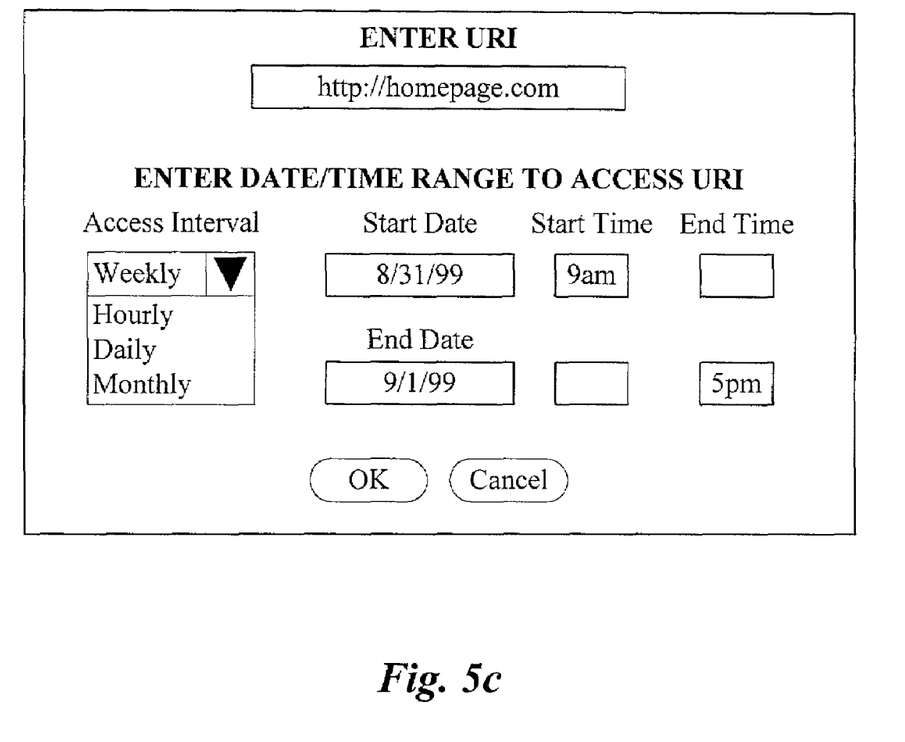
FIG. 5c is an illustration of a GUI for scheduling a starting page in accordance with the present invention.
Figure 5D:
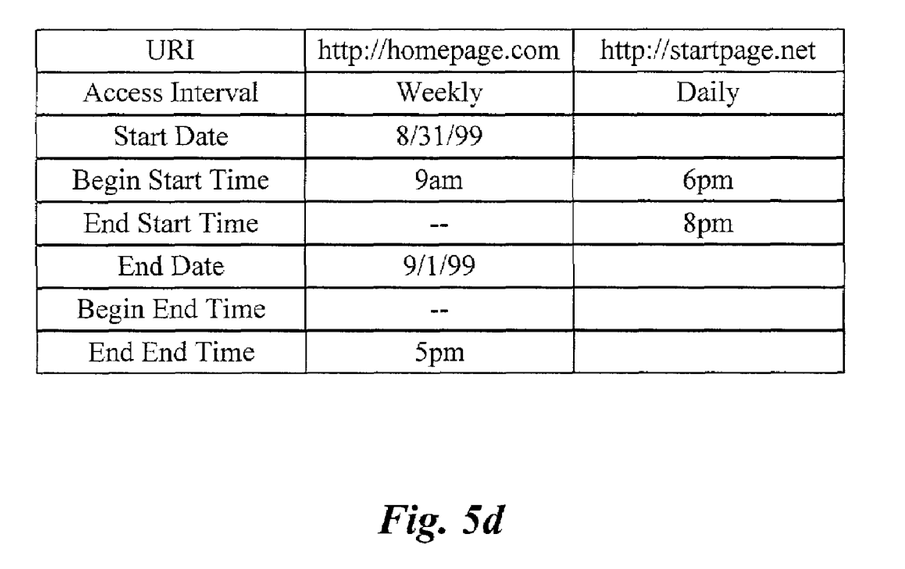
FIG. 5d is an illustration of the data structure for accessing a URI that corresponds to a system date/time in accordance with the present invention.

Referring now to FIG. 5c, another GUI is illustrated for scheduling a URI as a starting web page. Starting and ending days, dates, and times may be be entered along with a specified starting page through the GUI. When the information is confirmed by the program interface by using an input device to select OK, then the data may be stored accordingly in a data record of a database to be used by the scheduler program for determining which URI to access. FIG. 5d illustrates the data structure of such a database. The data structure may include scheduling parameters 178 such as URI, access interval (periodicity), start day, end day, begin/end start time, and begin/end end time. In addition, other data elements (not shown) may be included in the data structure such as multiple URIs (starting pages) for each data record and also the inclusion of any GPS data that corresponds to each URI.

For instance, a URI may correspond to one of a telephone area code and zip code (as a shortcut for corresponding GPS data to the selected URI), wherein each selected telephone area code and zip code further corresponds to a range or loci of GPS values. When GPS data is received upon program execution such as a user login, the GPS data may be translated into an area code and/or zip code for the purpose of retrieving a network resource pertaining to such a location.

A web based calendar service may be used to access the content of a starting page through a calendar store. Companies on the Web such as Yahoo, ICQ, Lycos, AOL and the like offer calendar services to allow individuals or groups to utilize web based scheduling of appointments and events. A new URI for accessing calendar stores is defined in a working draft dated Oct. 25, 1999, entitled, "Calendar Access Protocol (CAP)" at "http://www.ietf.org/internet-drafts/draft-ietf-calsch-cap-01.txt" from the Internet Engineering Task Force (IETF) Calendaring and Scheduling Working Group, which is herein incorporated by reference. An example of such a new URI may be as follows, "cap://calendar.example.com/user1startpage". By deploying a CUA to access at least one calendar from the URI via CAP protocol, the correct scheduled URI corresponding to the current system date/time may be retrieved from the calendar and used as a starting page.

Although the invention has been shown and described with respect to a certain preferred aspect or aspects, it is obvious that equivalent alterations and modifications will occur to others skilled in the art upon the reading and understanding of this specification and the annexed drawings. In particular regard to the various functions performed by the above described items referred to by numerals (components, assemblies, devices, compositions, etc.), the terms (including a reference to a "means") used to describe such items are intended to correspond, unless otherwise indicated, to any item which performs the specified function of the described item (e.g., that is functionally equivalent), even though not structurally equivalent to the disclosed structure which performs the function in the herein illustrated exemplary aspect or aspects of the invention. In addition, while a particular feature of the invention may have been described above with respect to only one of several illustrated aspects, such feature may be combined with one or more other features of the other aspects, as may be desired and advantageous for any given or particular application.

The description herein with reference to the figures will be understood to describe the present invention in sufficient detail to enable one skilled in the art to utilize the present invention in a variety of applications and devices. It will be readily apparent that various changes and modifications could be made therein without departing from the spirit and scope of the invention as defined in the following claims.

What is claimed is:

1. A homepage access method comprising:
   generating a request to automatically select and access a homepage in response to launching a web browser having homepage selection information;
   retrieving said homepage selection information from said web browser and a current time of said request, said homepage selection information including at least one resource identifier corresponding to at least one of a time and time range; and,
   selecting and accessing the homepage from a server located from said at least one resource identifier corresponding to said at least one of a time and time range upon or after determining that said current time of said request corresponds to said one of a selected time and time range.

2. The method, as set forth in claim 1, wherein said web browser is launched by at least one of a user, calendar program, and user login request, and wherein said current time of said request is a current local time of said user.

3. The method, as set forth in claim 1, wherein said at least one resource identifier corresponding to said at least one of a time and time range is scheduled in a calendar program capable of updating said homepage selection information of said web browser.

4. The method, as set forth in claim 1, wherein said accessing the homepage further includes locating one or more network resources from said at least one resource identifier.

5. The method, as set forth in claim 1, wherein said homepage selection information is retrieved from one of a list, data file, database, calendar, scheduler, user modifiable configuration settings, browser preferences, starting page preferences, and configuration preferences.

6. The method, as set forth in claim 1, wherein said determining said current time of said request includes determining a current system date/time of at least one of said user and said request.

7. The method, as set forth in claim 1, further including contemporaneously accessing one or more homepages from each resource identifier of said at least one resource identifier.

8. The method, as set forth in claim 7, wherein said contemporaneously accessing said one or more homepages includes presenting each said accessed homepage across one or more display windows.

9. The method, as set forth in claim 1, wherein said at least one resource identifier is at least one Uniform Resource Identifier (URI).

10. A homepage access method comprising:
   a user executing a client program, said client program including user homepage configuration information, said user homepage configuration information including a predetermined time range corresponding to at least one resource identifier,
   determining that said current time of said user is within said predetermined time range corresponding to said at least one resource identifier in response to said user executing said client program; and,
   accessing the homepage with said program from said at least one resource identifier.

11. The method, as set forth in claim 10, wherein said program is one of a web browser, user login request, and calendar program.

12. The method, as set forth in claim 10, further including said user scheduling said at least one resource identifier to correspond to said predetermined time range.

13. The method, as set forth in claim 10, wherein said accessing the homepage further includes locating a network resource from said at least one resource identifier.

14. The method, as set forth in claim 10, wherein said at least one resource identifier is at least one Uniform Resource Identifier (URI).

15. The method, as set forth in claim 10, wherein said homepage configuration information is retrieved from at least one of a list, data file, database, calendar, scheduler, user modifiable configuration settings, browser preferences, starting page preferences, and configuration preferences.

16. The method, as set forth in claim 10, wherein said determining said current time of said user when said program is executed includes determining a current system date/time in response to executing said program.

17. The method, as set forth in claim 10, further including contemporaneously accessing the homepage from each resource identifier from said at least one resource identifier.

18. The method, as set forth in claim 17, wherein said contemporaneously accessing the homepage includes displaying a separate display window for each said accessed homepage.

19. A homepage access method comprising:
   receiving a request to access a user homepage;
   retrieving user homepage selection information including a plurality of resource identifiers, wherein each said resource identifier corresponds to a separate homepage;
   contemporaneously accessing a plurality of homepages from said plurality of resource identifiers; and,
   presenting each said accessed homepage in its own display window.

20. The method, as set forth in claim 19, wherein said request is executed by at least one program.

21. The method, as set forth in claim 20, wherein said at least one program includes at least one of a web browser, calendar, user login, script, servlet, and applet.

22. The method, as set forth in claim 19, wherein said homepage selection information is retrieved from one of a list, data file, database, calendar, scheduler, user modifiable configuration settings, browser preferences, starting page preferences, and configuration preferences.

23. The method, as set forth in claim 22, wherein said starting page preferences include resource identifiers last visited by said user and said plurality of predetermined resource identifiers are accessed from said user last visited resource identifiers stored in said starting page preferences.

* * * * *